United States Patent
O'Connell et al.

[11] Patent Number: 5,837,362
[45] Date of Patent: Nov. 17, 1998

[54] MIRROR WITH SCRATCH RESISTANT SURFACE

[76] Inventors: Lawrence E. O'Connell, 1409 Summerhill Way, Louisville, Ky. 48223; David H. Bozeman, 8602 Canopus Pl., Louisville, Ky. 40219

[21] Appl. No.: 754,689

[22] Filed: Nov. 21, 1996

Related U.S. Application Data

[60] Provisional application No. 60/007,428, Nov. 21, 1995.

[51] Int. Cl.⁶ .............................. B32B 15/00; C03C 17/34
[52] U.S. Cl. ...................... 428/217; 359/359; 359/360; 359/584; 359/585; 359/589; 427/164; 427/165; 428/212; 428/432; 428/433; 428/469; 428/472; 428/698
[58] Field of Search ................................ 428/698, 432, 428/433, 457, 469, 472, 217, 212; 359/359, 360, 584, 585, 589; 427/164, 165

[56] References Cited

U.S. PATENT DOCUMENTS

| | | |
|---|---|---|
| 4,341,841 | 7/1982 | Ohno et al. . |
| 4,358,507 | 11/1982 | Senaha et al. . |
| 4,364,637 | 12/1982 | Ohno et al. . |
| 4,431,268 | 2/1984 | Ohno et al. .............................. 350/590 |
| 4,450,201 | 5/1984 | Brill et al. .............................. 428/432 |
| 4,753,504 | 6/1988 | Kyogoku ................................. 350/641 |
| 4,780,372 | 10/1988 | Tracy et al. . |
| 5,000,528 | 3/1991 | Kawakatsu .............................. 350/1.7 |
| 5,215,832 | 6/1993 | Hughes et al. . |
| 5,310,603 | 5/1994 | Fukuda et al. .......................... 428/698 |

*Primary Examiner*—Archene Turner
*Attorney, Agent, or Firm*—Reising, Ethington, Learman & McCulloch, PLLC

[57] ABSTRACT

A mirror including a glass substrate, a reflective layer of chromium on the substrate, and a reactively sputtered overcoat of titanium nitride.

7 Claims, 1 Drawing Sheet

MIRROR WITH SCRATCH RESISTANT SURFACE

This application is filed claiming priority from U.S. provisional application Ser. No. 60/007,428 filed Nov. 21, 1995.

FIELD OF THE INVENTION

The invention generally relates to mirrors and, more specifically, a scratch resistant coating for automotive mirrors.

BACKGROUND OF THE INVENTION

There is a need in the automotive industry for mirrors, especially outside rear-view mirrors, with improved scratch resistance. Standard automotive mirrors comprise a glass substrate having a reflective chromium coating applied thereto which is subject to scratching and corrosion when exposed to the elements. The prior art has attempted to provide protective coatings over the reflective chromium layers in various forms.

For example, U.S. Pat. No. 5,215,832 to Hughes et al. discloses a mirror including a glass substrate, a reflective layer, and an outer layer comprising an opaque polymeric film covering the reflective layer. A protective barrier layer is placed between the outer polymeric layer and the reflective layer comprising one or more metals or metal alloys, such as titanium nitride. The barrier layer is intended to protect the reflective layer from corrosion.

Another example is U.S. Pat. No. 4,358,507 to Senaha et al. which discloses a mirror comprising a glass substrate, a reflective metallic layer on the glass, and a light-transmittable protective layer. The use of titanium nitride as a protective layer is disclosed which results in a golden colored outer layer, significantly tinting the light reflected from the mirror.

The prior art does not disclose a light-transmittable protective layer which provides sufficient protection to the mirror surface without significantly affecting the color, luminous transmittance, or spectral reflectance of the mirror.

SUMMARY OF THE INVENTION

The invention described below resides in a scratch resistant automotive coating for use on the front surface of a glass substrate and in a process for applying the coating. The invention is referred to herein as the "ultra-chrome scratch resistant automotive coating."

DESCRIPTION OF THE DRAWINGS

Other advantages of the present invention will be readily appreciated from the following detailed description of the invention when considered in connection with the accompanying drawings wherein.

DESCRIPTION OF THE PREFERRED EMBODIMENT

Figure 1:
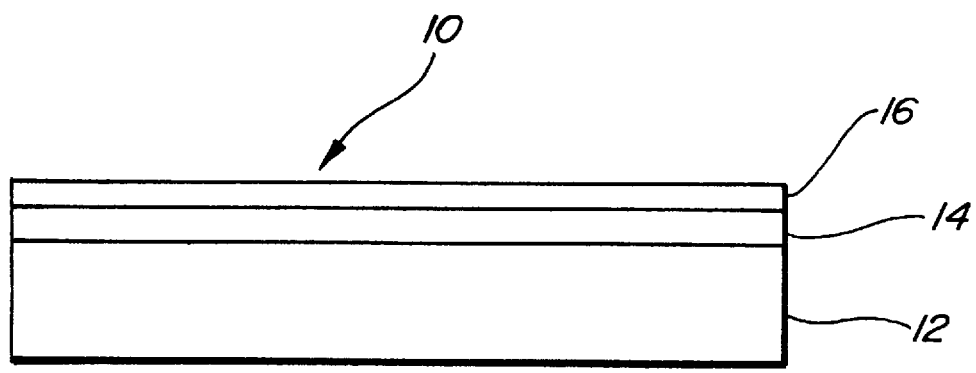
FIG. 1 is a cross-sectional view of a mirror made in accordance with this invention.

As shown in FIG. 1, the present invention comprises a mirror 10 including a glass substrate 12 and a two layer film comprising a reflective chromium layer 14 and a protective overcoat 16 of titanium nitride. The protective overcoat 16 provides scratch resistance to the mirror 10 without significantly changing the color of the mirror 10 or significantly affecting the luminous transmittance or spectral reflectance of the mirror 10. In the embodiment shown in FIG. 1, the two layer film 14,16 is on a front surface of the glass substrate 12 such that the glass 12 is behind the reflective layer 14 when the mirror 10 is used.

To manufacture a mirror without the protective overcoat 16, a reflective chromium layer is DC planar magnetron sputtered onto a glass substrate in a turnkey vacuum vessel. The reflective layer consists of 99.7% pure chromium sputtered in a gas plasma consisting of the inert gas argon with 18% nitrogen gas per total volume of gas. The nitrogen gas is added to help with abrasion resistance of the chromium film and improves film uniformity. The luminous transmittance of this single layer film, without the protective overcoat 16, is less than 4% and the spectral reflectance of the film is around 60% to 64%. The two layer film 14,16 of the present invention is applied by reactively sputtering an overcoat 16 of titanium nitride onto the reflective layer 14.

The two layer film 14,16 is deposited in a single pass in a turnkey vacuum coating vessel. Both films 14,16 are sputtered onto the glass substrate 12 progressively in one single vacuum vessel with precise gas quantities being delivered to three cathodes to permit conventional sputtering for the reflective chromium layer 14 and reactive sputtering for the overcoat layer 16 at the same time and in the same vessel. The thickness of the overcoat layer 16 was determined by applying only enough Titanium Nitride to increase scratch resistance by approximately 100%, provide only nominal color change, and not significantly effect the overall reflective value. Overcoats that are too thick will not increase the scratch resistance and will be lower in reflection and have a yellowish tint.

The parameters for the sputtering process are as follows: cathode one is 99.7% chromium, cathode two is 99.7% chromium, and cathode three is 99.9% titanium. Each cathode has its own gas manifold or bleed. The coating speed is 24 cycles per hour.

For a mirror made without the titanium nitride overcoat 16, cathode three is not utilized and 99.7% pure chromium is sputtered onto the glass substrate in a vacuum vessel with argon gas. The total gas pressure is about 1.0 millitorr, and the conveyor speed is approximately 18 feet per minute. The total deposition time is approximately 0.11 min and the total power on two cathodes is approximately 45 KW. More detailed parameters are set forth in the table below.

| Standard Chromium automotive Film | | |
| --- | --- | --- |
| Cath #1: 24 KW | 115 sccm Argon | 25 sccm Nitrogen (17.9%) |
| Cath #2: 21 KW | 115 sccm Argon | 25 sccm Nitrogen (17.9%) |

When the titanium nitride overcoat 16 is added, cathode three is utilized. The overcoat 16 comprises 99.9% pure titanium reactively sputtered onto the chromium layer 14 in a vacuum vessel with argon gas and an approximately 45% nitrogen gas mixture. The total gas pressure is the same as above because it is being sputtered in the same vessel at the same time. Although the conveyor speed is also the same, the total deposition time is one-half of the time for the reflective chromium layer 14. The total power on one cathode is approximately 7.5 KW. More detailed parameters are summarized below.

| Ultra-Chrome Scratch Resistant Automotive Film | | |
|---|---|---|
| Cath #1: 26 KW | | |
| Cath #2: 23 KW | 115 sccm Argon | |
| Cath #3: 7.5 KW | 115 sccm Argon | 110 sccm Nitrogen (46.5%) |

The hardness of the two-layered film 14,16 was tested by using a Moh's scale testing device engineered by TFC, Inc. and correlating the data to the Vickers hardness scale. The testing device was fabricated by, and testing was completed by, an outside source that is an AL2LA certified laboratory. A standard chromium layer without a protective overcoat 16 has a Vickers scale hardness of 550. The two layer film of the present invention including the protective overcoat 16 has a Vickers scale hardness of approximately 1000.

The luminous transmittance of the reflective layer 14, without the protective overcoat 16, is less than 4% and the spectral reflectance is around 60% to 64%. Ideally, the luminous transmittance is maintained less than 2.5 % for optimal performance of the mirror. The addition of the protective overcoat 16 does not change the luminous transmittance significantly, and the spectral reflectance remains above 57%. Ideally, the spectral reflectance must be above 55 %.

The color difference when the protective overcoat is added is measurable with a spectrophotometer, but almost negligible to the human eye. For example, a BYK Gardner Spectroguard Color System, Model 96 spectrophotometer was used to compare the color difference. The reflected color of the film was measured by the CIELAB color scale, illuminant A, spectral included. The CIELAB color scale provides an a* value and a b* value. As the a* value increases in the positive direction, the color is progressively more red. Similarly, as the a* value increases in the negative direction, the color is progressively more green. As the b* value increases in the positive direction, the color is progressively more yellow as opposed to blue if the b* value is negative.

As the thickness of the titanium nitride overcoat increases, the b* value will increase in the positive direction and the mirror will take on a yellowish tint. Ideally, the b* value must remain below +5. The results of a comparison test between the standard chromium layer without a protective overcoat 16 and with a protective overcoat 16 are summarized in the table below.

| Color Measurements | | | |
|---|---|---|---|
| Equipment: | BYK Gardner Spectroguard Model #96 Spectrophotometer Illuminant A (Required by FMVSS 111) 2 Degree Observer Calibration: Spectral Included | | |
| | Color Scales: | CIELAB a* and b* Chromaticity Y (Spectral reflectance or luminous transmittance) | |
| Results | | | |
| Standard Chromium: | | | |
| Reflectance: | Y = 62.18 | a* = +0.39 | b* = +1.47 |
| Transmittance: | Y = 1.05 | a* = +1.25 | b* = +3.08 |
| Including Titanium Nitride Overcoat: | | | |
| Reflectance: | Y = 62.60 | a* = +0.66 | b* = +2.14 |
| Transmittance: | Y = 0.99 | a* = +0.52 | b* = +2.70 |

The spectral limitations of 2.5 % maximum transmittance, 55 % minimum reflectance, and a maximum b* value of +5 were selected based primarily upon observations of the mirror as a progressively thicker layer of titanium nitride was applied. It was determined that a b* value of +5 was the upper limit beyond which a yellowish tint would be noticeable to the naked eye. Similarly, the minimum reflectance of 55 % was selected as a point at which the loss in reflectance compared to a mirror without the titanium nitride overcoat would be noticeable to the naked eye.

Although the description of this invention has been given with reference to a particular embodiment, it is not to be construed within a limiting sense. Many variations and modifications will no doubt occur to those skilled in the art. For a definition of the invention, reference is made to the appended claims.

What is claimed is:

1. A mirror which comprises:
   a substrate including a front side adapted to be viewed and a rear side;
   a multi-layered coating on said front side of said substrate;
   said coating including a reflective layer having a luminous transmittance of less than approximately 4%;
   said coating including an outer layer of titanium nitride in an amount sufficient to provide a Vickers scale hardness of said coating above 550 while maintaining the spectral reflectance above 55%; and
   said outer layer being in an amount sufficient to maintain the CIELAB color scale b* value less than +5 of said coating.

2. The mirror of claim 1 wherein said outer layer is in an amount sufficient to increase the Vickers scale hardness of said coating by approximately 450.

3. The mirror of claim 1 wherein said reflective layer is made of chromium.

4. The mirror of claim 1 wherein said layer of titanium nitride is the outermost layer of said mirror.

5. The mirror of claim 1 wherein said outer layer is in an amount sufficient to increase the Vickers scale hardness of said coating by approximately 100%.

6. A method of manufacturing a mirror comprising:
   applying a reflective layer having a luminous transmittance of less than approximately 4% to a viewing surface of a substrate;
   applying an outer layer of titanium nitride to the reflective layer in an amount sufficient to provide a Vickers scale hardness of the combined reflective layer and outer layer of more than 550 while maintaining the spectral reflectance above 55% and maintaining the CIELAB color scale b* value below +5.

7. The method of claim 6 including applying the outer layer of titanium nitride in an amount sufficient to provide a Vickers scale hardness of approximately 1000 of the reflective layer and outer layer.

* * * * *